Patented Mar. 11, 1952

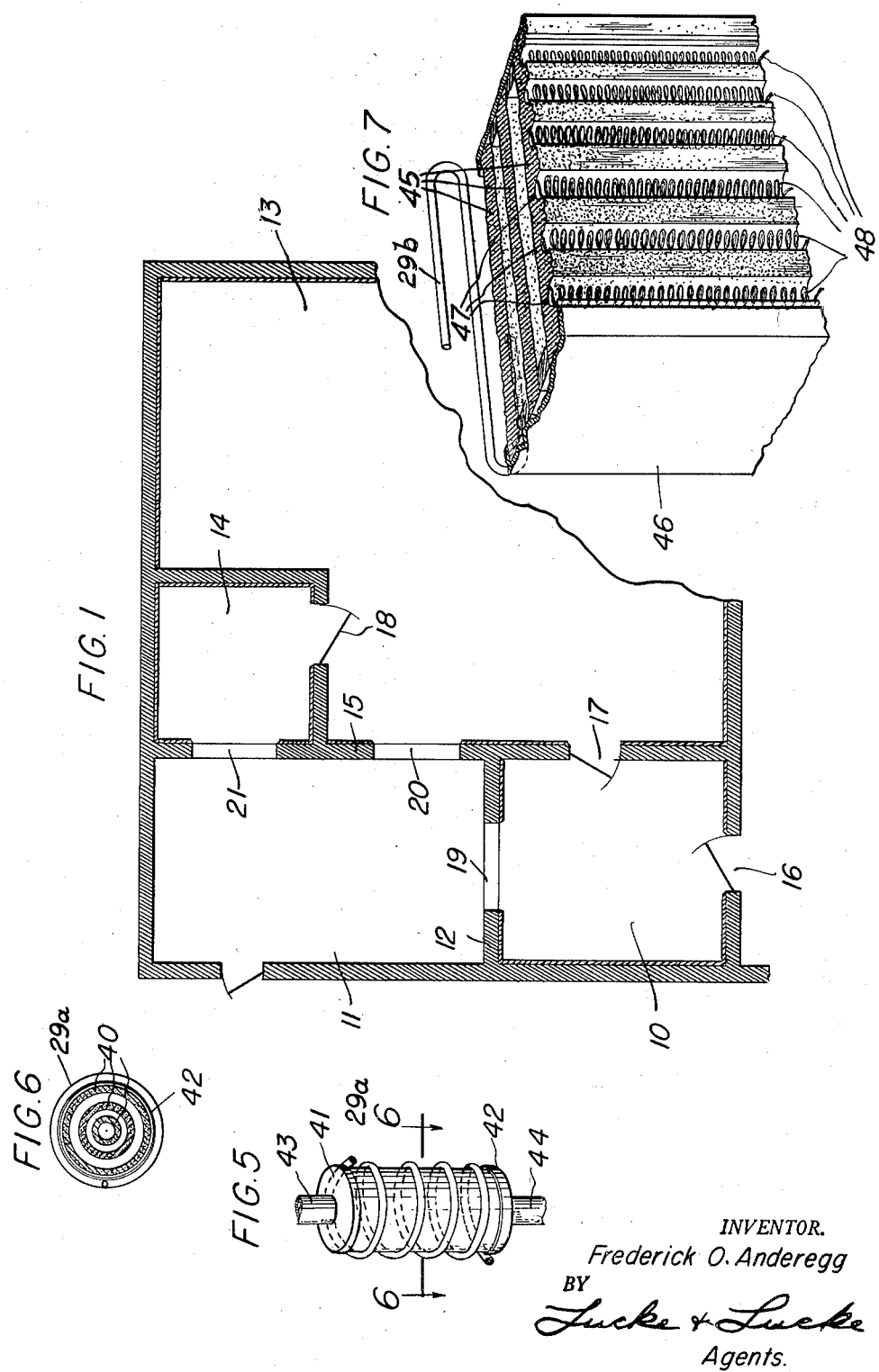

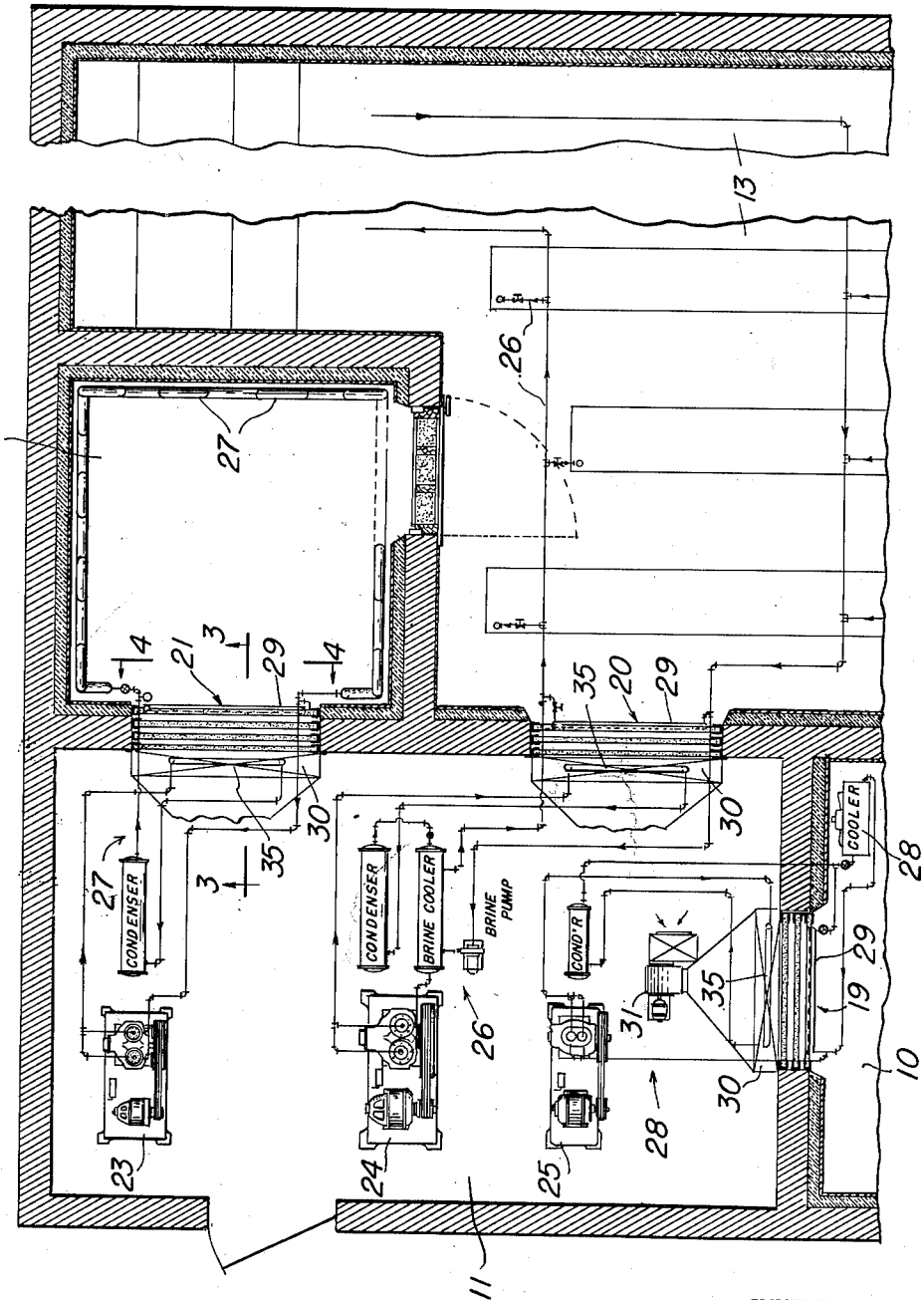

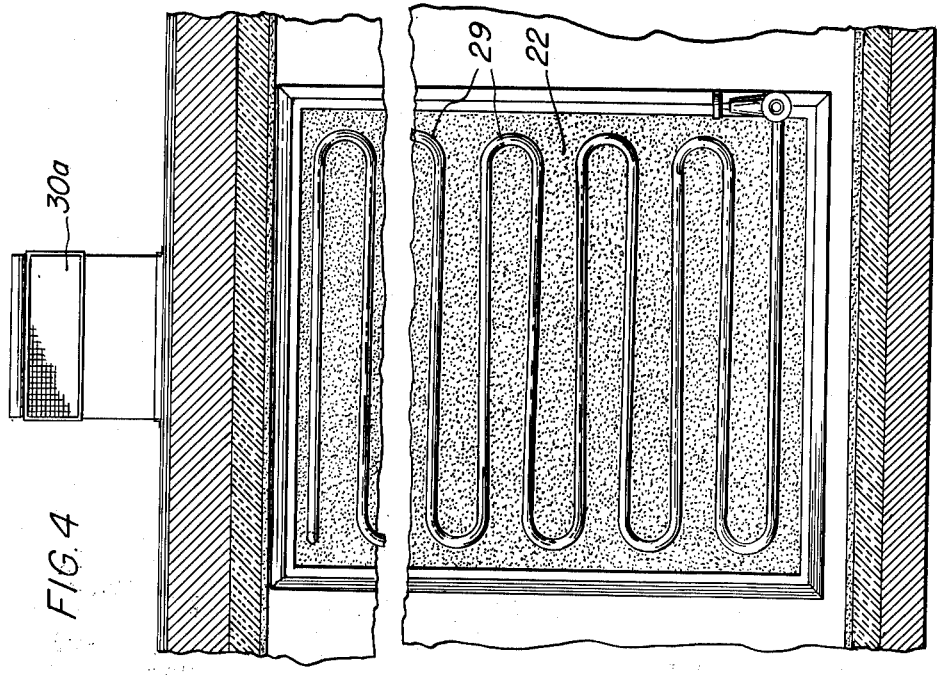
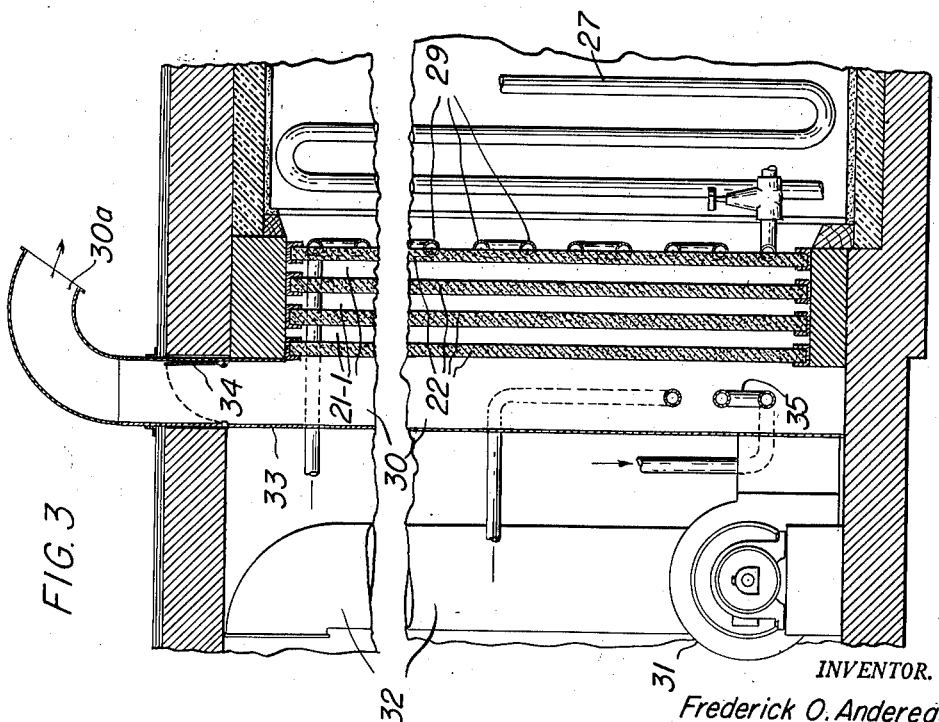

2,588,339

UNITED STATES PATENT OFFICE 2,588,339

DEHUMIDIFYING SYSTEM

Frederick O. Anderegg, Somerville, N. J., assignor to John B. Pierce Foundation, New York, N. Y., a corporation of New York Application April 29, 1948, Serial No. 24,087

2 Claims. (Cl. 183—4.3)

This invention relates to dehumidifying systems whereby moisture is extracted from gaseous atmospheres, and especially to dehumidifying systems useful in the refrigerating and freezing arts.

Artificially produced freezing temperatures are ordinarily accompanied by condensation of moisture from air subjected thereto, the condensate collecting in the form of a crust of snow or ice. This is particularly objectionable in food storage lockers and quick freeze rooms, where such condensate builds up to considerable thickness over periods of time and necessitates the taking of special steps for its removal periodically.

The system of the invention is designed to effectively remove moisture from atmospheres, freezing or otherwise, thereby relieving the objectionable condition noted above. For this purpose, a series of spaced highly porous wall elements is arranged between a flow of relatively dry heated air and the atmosphere to be dehumidified, a cooling coil being disposed at the porous surface against which the moisture-laden atmosphere impinges. The number of porous wall elements in the series is determined by the difference in temperature between the air to be dehumidified and the relatively dry heated air, since it has been found advantageous to elevate the temperature in steps of approximately 20 degrees Fahrenheit.

In connection with frozen-food locker plants, a dehumidifying unit of the type described is employed in the vestibule to eliminate a substantial proportion of the moisture carried by the out-of-doors atmosphere before that atmosphere passes into the locker room. It is advantageous that another of such units be employed in the locker room, and another in the quick freeze room, thereby progressively relieving the atmosphere of moisture in a manner which automatically disposes of the precipitated moisture.

The principle of dehumidification employed in the present system bears a certain relation to that of the apparatus set forth and claimed in my United States Letters Patent No. 2,336,456, issued December 14, 1943. In that patent, dehumidifying apparatus is disclosed wherein the moisture in a moisture-laden atmosphere is condensed on one side of a tube of highly porous material. The moisture is drawn through the wall of the tube and carried away by a moving column of heated and dehumidified air or other gas moving through the tube.

Here, however, the problem of wide differences in temperature between the atmosphere to be dehumidified and the regenerative atmosphere led to the development of what might be termed a "cascade" arrangement of a series of spaced thicknesses of moisture-pervious material, whereby the temperature differential between opposite faces of a thickness is established at an optimum, and the plurality of such thickness is employed as a porous wall between the atmosphere to be dehumidified and the regenerative atmosphere.

In the present apparatus a plurality of highly porous walls, suitably spaced, are interposed between the moisture-laden atmosphere and the column of heated and dehumidified air. Thus the heated and dehumidified air heats the porous wall past which it moves, and convection currents in the spaces between each pair of the plurality of highly porous walls will transfer heat progressively from one wall to the next, beginning with the wall adjacent the heated column of air and ending with the wall adjacent the moisture-laden atmosphere. Accordingly moisture will be drawn step-by-step from the moisture-laden atmosphere through the successive walls, through the spaces between the walls to the column of heated and dehumidified air.

The porous cascade arrangement of spaced thicknesses of moisture-pervious material is useful for a variety of dehumidifying purposes, and, as such, represents a subcombination of the larger inventive combination here disclosed.

An object, then, of the present invention is to provide for effective dehumidification of refrigerated air.

An object is to provide an efficient dehumidifying system for cold storage and frozen food lockers.

A further object is to provide a dehumidifying agency useful under a variety of conditions and applicable to a variety of systems.

Additional objects and features of the invention will be apparent from the following detailed description of the several preferred embodiments specifically illustrated in the accompanying drawings.

In the drawings:

Fig. 1 is a floor plan of a typical frozen food locker plant pursuant to the invention;

Fig. 2 is an enlarged fragmentary view similar to Fig. 1 illustrating details of the plant and of the dehumidifying system;

Fig. 3 is a fragmentary vertical section taken on the line 3—3 of Fig. 2, a portion of the height being broken away for convenience of illustration;

Fig. 4 is a similar vertical section taken on the line 4—4 of Fig. 2 and illustrating the cascade arrangement of the invention in elevation;

Fig. 5 is a perspective view of a tubular cascade arrangement for general dehumidifying use;

Fig. 6 is a horizontal section taken on the line 6—6 of Fig. 5; and

Fig. 7 is a perspective view of another embodiment of cascade dehumidifying unit pursuant to the invention.

Referring now to the drawings: in Fig. 1 is illustrated a floor plan of a typical frozen food locker plant embodying the dehumidifying system of the invention. As illustrated, the plant comprises an entry vestibule 10 divided from the engine room 11 by a wall 12. It also comprises a frozen food locker room 13 and a quick freeze room 14, both being divided from the engine room 11 by respective portions of a wall 15. Entrance to the vestibule 10 from the outside is provided by a door 16, and a door 17 leads from the vestibule into the locker room 13. A door 18 affords admission to the quick freeze room 14 from the locker room.

For the purpose of progressively dehumidifying outside air entering the plant through the door 16 as it is opened from time to time to admit and discharge patrons of the establishment, a series of dehumidifying wall sections are provided in the plant. In the illustrated embodiment there is a dehumidifying wall section 19, providing part of the wall 12 between vestibule and engine room, and two dehumidifying wall sections 20 and 21 providing parts of the wall 15, the former being disposed in the wall portion between locker room 13 and engine room and the latter in the wall portion between quick freeze room 14 and engine room.

As illustrated in Figs. 2, 3, and 4, each of the dehumidifying wall sections comprises a series of spaced, coextensive plates 22 which extend with the wall and provide pervious passage for moisture from one face of the wall to the opposite face thereof. Each plate 22 is of moisture-pervious, heat-insulating material, preferably the light-weight, highly porous cementitious material produced in accordance with U. S. Patent No. 1,932,971, issued October 31, 1933, to Hutteman et al. or with my U. S. Patent No. 2,255,041, issued September 9, 1941. When made of the specified preferred materials, the plates are each advantageously from one to two inches in thickness. The spaces 21—1 between plates are each advantageously two inches or thereabouts in thickness for the purpose of affording good connections therein. Although considerable variation in plate thickness and in spacing between plates may be employed, it has been found by experiment that plates having a thickness of from one to two inches together with spaces between the plates of substantially two inches give the most desirable results. The number of plates employed in any given instance is determined by the temperature differential between opposite faces of the wall, it having been found that optimum dehumidifying results are achieved when the temperature differential between opposing faces of a single plate is approximately 20 degrees Fahrenheit.

The fact that the above moderate temperature differential produces an optimum dehumidifying action is an advantage in that a cascade arrangement of plates such as here disclosed maintains heat transference between cold room and warm room at a minimum.

The engine room 11 normally has a temperature of 80 degrees because of the several compressors 23, 24, and 25 of the refrigerating systems employed to maintain the other rooms of the plant at requisite reduced temperatures. The locker room 13 is ordinarily maintained at 20 degrees by the standard brine cooling system 26, while the quick freeze room is kept at minus 5 to minus 15 degrees by the direct expansion system 27 of standard type. The temperature of the entry vestibule 10 is preferably maintained at approximately 30 degrees by the standard refrigeration system 28.

Accordingly, the dehumidifying wall section 19 is made up of three of the plates 22, as shown, or of only two. The section 20 is made up of three, and the section 21 of four, all as illustrated in Fig. 2.

In accordance with the dehumidifying principle of my afore-mentioned U. S. Patent No. 2,336,456 the fugacity of the air to be dehumidified is lowered at the exposed dehumidifying face of the dehumidifying wall section, while regenerative warm air is passed in intimate contact with the opposite exposed regenerative face of the section. For this purpose, refrigerating coils 29 are run along the dehumidifying faces of the respective wall sections in intimate contact therewith, see Fig. 4, while provision is made for passing engine room air in intimate contact with the opposite regenerative faces of the said respective wall sections.

As illustrated in Figs. 2 and 3, a duct 30 is run from bottom to top of the exposed regenerative face of each of the dehumidifying wall sections 19, 20, and 21, comprehending the width thereof and being entirely open to such regenerative face. A power blower of fan 31 sucks in the warm engine room air from near the ceiling of the engine room through an air intake duct 32, and directs it into the lower end of the duct 30. The upper end of duct 30 advantageously opens at 30a outside the building, but an outlet 33 leading into the upper portion of the engine room is provided, together with a control damper 34, for directing the warm air back into the engine room during cold seasons of the year. It is desirable that a line 35 carrying hot compressed refrigerant pass through the duct 30 for the purpose of providing even greater temperatures than those normal in the engine room, and in climates where the humidity is great the initial humidity of the engine room air may be reduced by any suitable means (not shown), for example by passing it over a cooling coil or through hygroscopic material prior to its entry into the duct 30.

The cascade arrangement of plates 22 may be employed as a dehumidifying agency in other arrangements and relationships than that illustrated, and, as such, forms a sub-combination of the larger combination described above. It will be noted that the essential characteristics of such sub-combination is that the series of plates 22 or other thicknesses of moisture-pervious material be framed by means maintaining the spaced relationship thereof and substantially confining the respective atmospheres of the spaces between. In the above-described arrangement the framing is provided by the wall into which the plates are fitted. Separate framing may be provided where the cascade arrangement is used in other relationships, see Fig. 7, and other forms than plates may provide the required thicknesses of dehumidifying material.

For example, as illustrated in Figs. 5 and 6, the several spaced thicknesses of material may be provided by concentric tubes 40, capped at opposite ends by plates 41 and 42 which serve as framing means. The inmost of the tubes 40 may be fitted with conduits 43 and 44 for regenerative air, and a cooling coil 29a may be wrapped around the outermost tube for reducing the fugacity of air to be dehumidified and removing the latent heat of vaporization.

In Fig. 7 is illustrated a cascade unit made up of a series of spaced plates 45 bounded peripherally by a frame 46. In grooves 47 provided in the outer face of one of the terminal plates of the series are positioned respective electrical resistance heater elements 48 to provide regenerative heat. The outer face of the opposite terminal plate of the series is adapted to be exposed to the atmosphere to be dehumidified. Provision is preferably made at such dehumidifying face for the taking up of latent heat of vaporization of the moisture in the atmosphere to be dehumidified, as by the provision of a cooling coil 29b. The heater elements 48 are advantageously electrically connected so that they may be used singly or in any desired combination.

The heating described above may be used in place of or to supplement the regenerative heating means utilized in the previously described embodiments.

Whereas this invention is here illustrated and described with respect to certain preferred embodiments thereof, it should be understood that various changes may be made therein and other embodiments may be constructed on the basis of the teachings hereof by those skilled in the art without departing from the scope of the following claims.

I claim:

1. Dehumidifying apparatus for extracting moisture from gaseous atmospheres, said apparatus comprising: a series of spaced, highly porous, wall elements, one of said elements being in contact with the atmosphere from which moisture is to be removed; a frame for said wall elements maintaining the spaced relationship thereof and confining the respective atmospheres between said wall elements; a refrigerating coil disposed at and in intimate contact with the dehumidifying face of the wall element in contact with the atmosphere from which moisture is to be removed; and means for applying a flow of relatively dry heated air to the wall element of said series which is distant from the element of said series in contact with the atmosphere from which moisture is to be removed, whereby the spaces between said wall elements are heated in progressively varying degree and moisture is drawn through said wall elements in step-by-step sequence from the moisture-bearing gaseous atmosphere to the flow of relatively dry heated air.

2. Dehumidifying apparatus for extracting moisture from gaseous atmospheres, said apparatus comprising: a plurality of spaced, parallel, coextensive plates of highly porous cementitious material, each of said plates having a thickness of from one to two inches, and the space between plates being substantially two inches; a frame for said wall elements maintaining the spaced relationship thereof and confining the respective atmospheres between said wall elements; said apparatus being adapted for positioning in a wall to pass moisture therethrough from one side of the wall to the other from a chilled plate of said apparatus, step-by-step, to a heated plate thereof.

FREDERICK O. ANDEREGG.

REFERENCES CITED

The following references are of record in the file of this patent:

UNITED STATES PATENTS

| Number | Name | Date |
|---|---|---|
| 2,223,586 | Thomas | Dec. 3, 1940 |
| 2,289,894 | Zuhlke | July 14, 1942 |
| 2,336,456 | Anderegg | Dec. 14, 1943 |
| 2,478,617 | Anderegg | Aug. 9, 1949 |

FOREIGN PATENTS

| Number | Country | Date |
|---|---|---|
| 409,652 | Great Britain | July 29, 1932 |